(12) United States Patent
Silverbrook et al.

(10) Patent No.: US 6,799,853 B2
(45) Date of Patent: Oct. 5, 2004

(54) DATA PROJECTOR WITH INTERNAL PRINTER

(75) Inventors: Kia Silverbrook, Balmain (AU); Janette Faye Lee, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 10/432,956

(22) PCT Filed: Nov. 22, 2001

(86) PCT No.: PCT/AU01/01512
§ 371 (c)(1),
(2), (4) Date: May 29, 2003

(87) PCT Pub. No.: WO02/44810
PCT Pub. Date: Jun. 6, 2002

(65) Prior Publication Data
US 2004/0032573 A1 Feb. 19, 2004

(30) Foreign Application Priority Data
Nov. 30, 2000  (AU) .............................................. PR1824

(51) Int. Cl.$^7$ .............................................. G03B 21/14
(52) U.S. Cl. .................................................... 353/122
(58) Field of Search .................................. 353/119, 122

(56) References Cited

U.S. PATENT DOCUMENTS

| 4,851,924 A | * | 7/1989 | Nakamura et al. .......... 358/296 |
| 4,990,951 A | * | 2/1991 | Sanbayashi ................... 355/40 |
| 5,140,428 A | | 8/1992 | Park |
| 5,404,185 A | | 4/1995 | Vogeley et al. |
| 5,782,548 A | * | 7/1998 | Miyashita ..................... 353/42 |
| 5,940,049 A | | 8/1999 | Hinman et al. |
| 6,386,711 B1 | * | 5/2002 | Petruchik et al. ........... 353/122 |
| 2002/0105624 A1 | * | 8/2002 | Quori ......................... 353/122 |

FOREIGN PATENT DOCUMENTS

| EP | 512799 A | 11/1992 |
| JP | 11-098440 A | 4/1999 |
| JP | 11-295813 A | 10/1999 |

OTHER PUBLICATIONS

Derwent Abstract Accession No. 97–300738/28, FR 2741462 A (VAUBOURG) May 23, 1997.

* cited by examiner

Primary Examiner—William C. Dowling

(57) ABSTRACT

Data projector (10) includes a built-in printer. Video data from a computer (17) may be converted and stored in a digital frame store. The printer may be activated by buttons (12, 13) or by a remote infrared signal, to print information from the digital frame store. Thus a printed record of a projected image may be made, without intervention of a computer based printer driver.

13 Claims, 2 Drawing Sheets

DATA PROJECTOR WITH INTERNAL PRINTER

BACKGROUND OF THE INVENTION

The following invention relates to a data projector with an internal printer. More particularly, though not exclusively, the invention relates to a data projector having a pagewidth drop on demand ink jet printhead and a source of print media located in the projector body.

It is known to make presentations to a group of people using a data projector connected to a portable computer. Using appropriate software, the portable computer can generate a sequence of text and/or graphic images for projection upon a screen using the projector.

The portable computer might also be connected to a printer. However, if a member or members of the group require a print-out of an image on a screen, printer driver software must be activated by the operator of the portable computer. Usually, a printer driver-associated window appears in the screen to report the status of any printing request. Such a window would be disruptive to the overall presentation as it would appear on the image being projected onto the screen. This would be disruptive, particularly if only one person of the group required a print-out.

The attachment of a separate printer to the portable computer would also be generally inconvenient as there would be separate cabling required between the computer and the printer and the printer would need a power supply, possibly requiring the use of an electrical double adaptor or the like.

OBJECTS OF THE INVENTION

It is an object of the present invention to overcome or substantially ameliorate at least one of the above disadvantages.

It is another object of the present invention to provide a data projector having an in-built printer.

It is a further object of the present invention to provide a simple means of printing a "screen dump" of a displayed image without the necessity of cabling in addition to that which would normally be necessary to operate the data projector with a portable computer.

It is yet another object of the present invention to provide a means of enabling a printed "screen dump" of an image projected by a data projector without that image being altered by any printer-driver software.

DISCLOSURE OF THE INVENTION

There is disclosed herein a data projector for projecting images at a viewing surface, the data projector including a built-in printer for printing an image projected by the projector.

Preferably the data projector receives video information from a portable computer.

Preferably, the data projector includes an activator to activate a print request.

Preferably, the activator is a button on the data projector.

Alternatively, the activator is a keypad on the data projector.

Alternatively, the activator includes a signal receiver on the data projector associated with a remote signal transmitter.

Preferably the signal receiver and/or transmitter use infra-red data transmission.

Preferably the data projector has means for storing a supply of print media therein.

Preferably integrated with and/or associated with circuitry in the projector is an analogue to digital converter to convert analogue image data into digital form.

Preferably the digital form of the image is stored in a frame store.

Preferably the projector also has built into it a print engine control chip receiving information from the frame store and sending that information to a printhead upon instruction from the activator.

Preferably a micro-control circuit controls information from the frame store to the print engine control chip.

Preferably the printhead is a pagewidth printhead such as that described in greater detail in our co-pending applications PCT/AU00/00594 and PCT/AU00/00578.

BRIEF DESCRIPTION OF THE DRAWINGS

A preferred form of the present invention will now be described by way of example with reference to the accompanying drawings wherein.

DESCRIPTION OF THE PREFERRED EMBODIMENT

Figure 1:
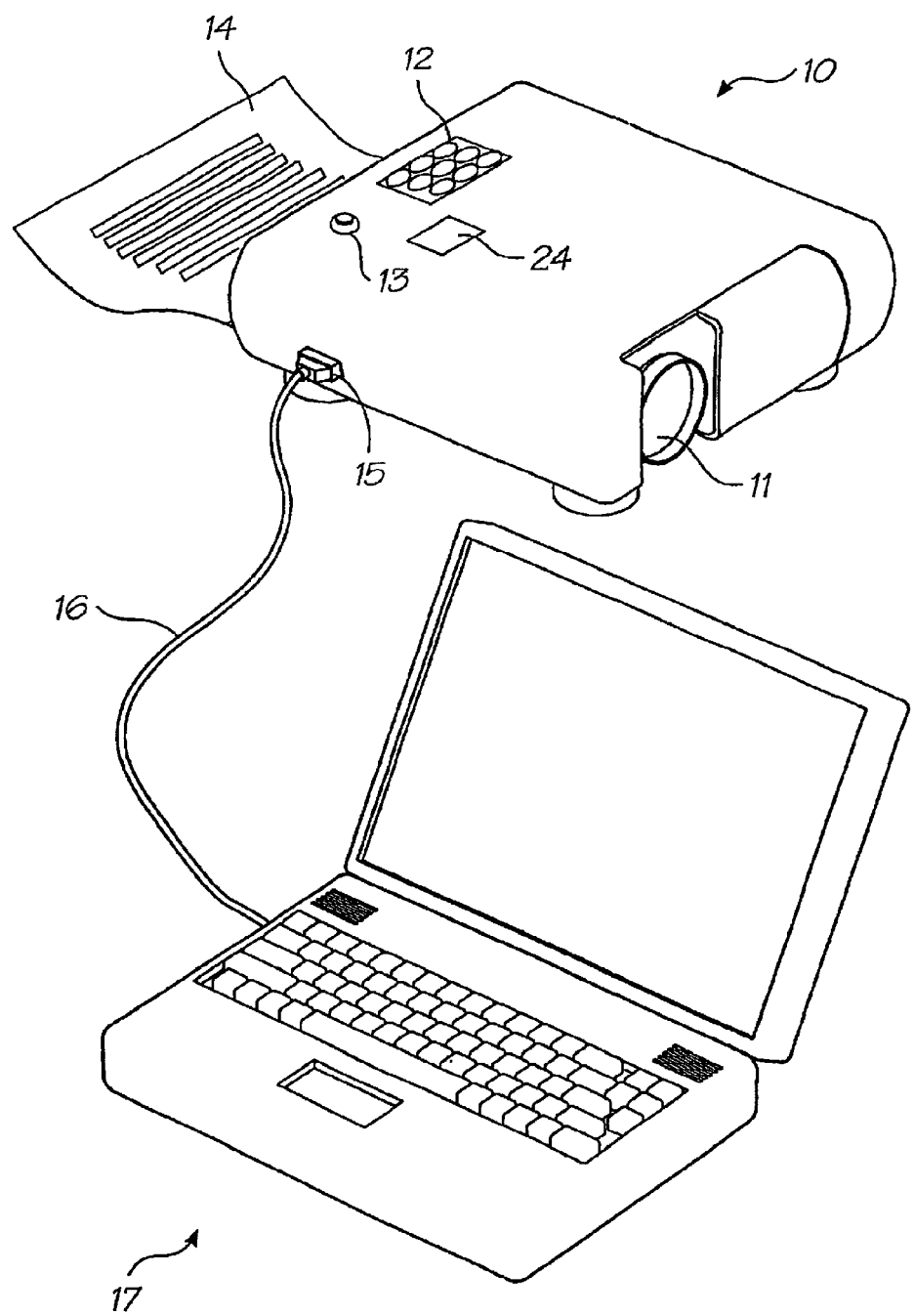
FIG. 1 is a schematic illustration showing an association between a data projector having an in-built printer and a portable computer.

In FIG. 1 of the accompanying drawings there is schematically depicted a data projector 10 interconnected with a portable computer 17 by means of a "VGA" cable 16. Cable 16 relays analogue video signals from the portable computer 17 to the projector 10. These signals would typically be "VGA" or Video Graphic Adaptor signals or signals providing a higher resolution image such as "SVGA" or Super Video Graphic Adaptor signals or the like.

Typically, cable 16 is the only cable extending between computer 17 and projector 10. However, if a desktop computer is used, a power supply cable might also extend from the computer to the projector.

The projector 10 includes a lens 11 by which an image is projected upon a screen.

Located within the housing of projector 10 is a printer including a printhead 23 and a store of print media (not shown). The print media would typically be A4 sized paper.

In order to activate a printing operation so as to produce a printout or "screen dump" of an image projected by lens 11, one of several activators is provided. For example, a single print button 13 might be provided or a keypad 12. As a further option, an infrared detector 24 might be provided.

Where a single print of an image being projected is required, button 13 might be depressed. As a result, a sheet 14 would be produced by the printer. It might be desirable to produce a print-out of every image of a sequence of images projected by the projector 10 and/or multiple copies of a single image for distribution to several people. This might be accommodated by pressing certain keys or combinations of keys on keypad 12.

The presenter of a presentation being projected by the projector 10 might hold an infrared remote control unit. Depression of a key or keys on that unit could transmit a signal to be read by infrared receiver 24 to produce the same effect as single button 13 or the keypad 12. More complex signals such as those required to achieve the same effect as pushing a key or combination of keys on keypad 12 might also be transmitted by an infrared remote control unit to the receiver 24.

Figure 2:
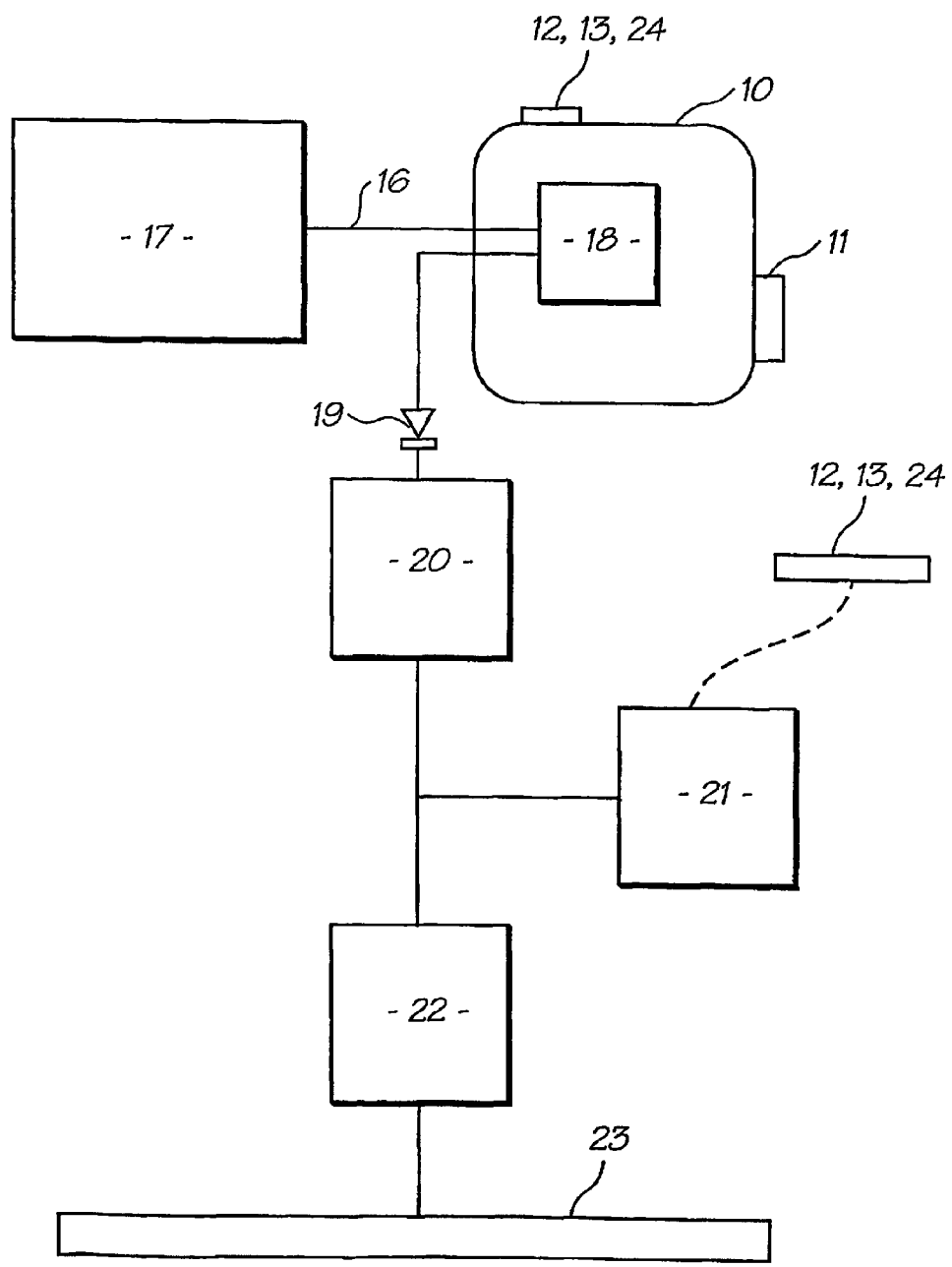
FIG. 2 is a schematic block diagram including circuitry built into the data projector to enable an image projected thereby to be printed.

With reference to FIG. 2, there is shown the computer 17 transmitting analogue video signals via cable 16 to projector circuitry 18 situated within projector 10. Associated with that circuitry or added thereto is an analogue to digital converter 19 converting analogue image data into digital form for storage in a digital frame store 20. That is, frame store 20 would hold at any given time digital information equivalent to an analogue image projected by lens 11.

The output of information from frame store 20 can be received by a print engine control chip 22 to control printhead 23 situated within the projector housing. A microcontrol 21 receives an activation signal from one of activation devices 12, 13 or 24 to instruct the print engine control chip to control the printhead so as to print a frame stored in frame store 20.

The printhead 23 would typically be a pagewidth printhead of the type disclosed in our co-pending applications PCT/AU00/00594 and PCT/AU00/00578. Associated with the printhead would be a print media transportation mechanism and platen across which the sheets would be driven whilst receiving printed information prior to dispensing from the projector housing as shown in FIG. 1.

It should be appreciated that modification and alterations obvious to those skilled in the art are not to be considered as beyond the scope of the present invention. For example, rather than incorporating the printer mechanism into a data projector, it could be incorporated into any video display device.

What is claimed is:

1. A data projector for projecting images at a viewing surface, the data projector including a built-in printer having a printhead for printing an image projected by the projector onto print media, the date projector receiving image information from a computer.

2. The data projector of claim 1 wherein the computer is a portable computer.

3. The data projector of claim 1 including an activator to activate a print request.

4. The data projector of claim 3 wherein the activator is a button on the data projector.

5. The data projector of claim 3 wherein the activator is a keypad on the data projector.

6. The data projector of claim 3 wherein the activator includes a signal receiver on the data projector associated with a remote signal transmitter.

7. The data projector of claim 6 wherein the signal receiver and/or transmitter use infra-red data transmission.

8. The data projector of claim 1 further including means for storing a supply of said print media therein.

9. The data projector of claim 1 wherein integrated with and/or associated with circuitry in the projector is an analogue to digital converter to convert analogue image data into digital form.

10. The data projector of claim 9 wherein the digital form of the image is stored in a frame store.

11. The data projector of claim 10 having built into it a print engine control chip receiving information from the frame store and sending that information to the printhead upon instruction from an activator for activating a print request.

12. The data projector of claim 11 wherein a microcontrol circuit controls information from the frame store to the print engine control chip.

13. The data projector of claim 1, wherein the printhead is a pagewidth printhead.

* * * * *